(12) United States Patent
Isosaki

(10) Patent No.: US 10,875,473 B2
(45) Date of Patent: Dec. 29, 2020

(54) VEHICLE INTERIOR MEMBER

(71) Applicant: KASAI KOGYO CO., LTD., Kanagawa (JP)

(72) Inventor: Yasuhiko Isosaki, Yamato (JP)

(73) Assignee: KASAI KOGYO CO, LTD., Kanagawa (JP)

( * ) Notice: Subject to any disclaimer, the term of this patent is extended or adjusted under 35 U.S.C. 154(b) by 111 days.

(21) Appl. No.: 16/464,354

(22) PCT Filed: May 30, 2017

(86) PCT No.: PCT/JP2017/019993
§ 371 (c)(1),
(2) Date: May 28, 2019

(87) PCT Pub. No.: WO2018/220695
PCT Pub. Date: Dec. 6, 2018

(65) Prior Publication Data
US 2020/0055462 A1     Feb. 20, 2020

(51) Int. Cl.
*B60R 13/02*     (2006.01)

(52) U.S. Cl.
CPC .................. *B60R 13/025* (2013.01)

(58) Field of Classification Search
CPC .................................................. B60R 13/025
See application file for complete search history.

(56) References Cited

U.S. PATENT DOCUMENTS

| | | | |
|---|---|---|---|
| 6,095,591 A | 8/2000 | Matsuyama et al. | |
| 2014/0265448 A1* | 9/2014 | Bartlett | B29C 45/14811 296/193.06 |
| 2016/0068115 A1* | 3/2016 | Inagawa | B60R 13/025 296/193.06 |
| 2017/0106811 A1* | 4/2017 | Dublan | B62D 25/04 |

FOREIGN PATENT DOCUMENTS

| | | | |
|---|---|---|---|
| DE | 19747107 A1 | 4/1998 | |
| EP | 0753432 A1 * | 1/1997 | ........... B60R 13/025 |
| GB | 2318551 A | 4/1998 | |
| JP | H08-127298 A | 5/1996 | |
| JP | H09-301089 A | 11/1997 | |
| JP | H10-152005 A | 6/1998 | |
| JP | H11-180236 A | 7/1999 | |
| JP | H11-208396 A | 8/1999 | |
| JP | 2003-118501 A | 4/2003 | |

OTHER PUBLICATIONS

International Search Report for International Application No. PCT/JP2017/019993 dated Aug. 29, 2017, Japan, 3 pages.

* cited by examiner

*Primary Examiner* — Lori L Lyjak
(74) *Attorney, Agent, or Firm* — United IP Counselors, LLC

(57) ABSTRACT

A vehicle interior member which absorbs input energy of a load properly is provided. A center pillar trim includes a trim body configured to cover a center pillar, and an absorber provided between the trim body and the center pillar. The absorber includes: a plurality of horizontal ribs rising perpendicularly to a face of the trim body having their respective faces opposed to each other; a contact surface provided continuously across the plurality of ribs so as to oppose to a bead-shaped part, which is provided at the center pillar to partially bulge on the cabin side.

3 Claims, 5 Drawing Sheets

VEHICLE INTERIOR MEMBER

CROSS-REFERENCE TO RELATED APPLICATIONS

This application is a National Stage Entry application of PCT International Application No. PCT/JP2017/019993, filed on May 30, 2017, the entire contents of which are hereby incorporated by reference.

BACKGROUND

1. Technical Field

The present invention relates to a vehicle interior member.

2. Description of the Background

Conventionally, the cabin of a vehicle is furnished with an interior member which covers a body member of the vehicle for any decorative or functional purposes. One known interior member of this kind includes a shock absorbing structure intended to address a load applied to the interior member on the cabin side.

For example, Japanese Unexamined Patent Application No. 11-208396 discloses a shock absorber formed of a rib structure fitted into the back surface of a garnish body. Japanese Unexamined Patent Application No. 10-152005 discloses a rib structure which absorbs energy by a rib being torn.

BRIEF SUMMARY

Meanwhile, there are known vehicle body members which include a bead-shaped part bulging on the cabin side for securing stiffness of the vehicle body. Recent vehicles are increasingly equipped with the bead-shaped part of a greater size. That is, the distance between a vehicle body member and an interior component covering the vehicle body member is being reduced.

Accordingly, it is often difficult to design the conventional shock absorbing structure with an enough travel distance for the rib to collapse. In a case where the collapsed rib is caught between the vehicle body member and the interior member, the rib may fail to reach the intended travel distance.

Similarly, with the conventional structure including the rib to be torn also, the torn rib may be caught between the vehicle body member and the interior member, failing to fully travel.

The present invention has been made in view of the foregoing, and an object thereof is to provide a vehicle interior member that properly absorbs input energy of a load.

In order to solve the problem, the present invention provides a vehicle interior member mounted on a cabin side to cover a vehicle body member of a vehicle, the vehicle interior member including: an interior member body configured to covering the vehicle body member; and an absorber provided between the interior member body and the vehicle body member. The absorber includes: a plurality of ribs rising perpendicularly to a face of the interior member body having their respective faces opposed to each other; and a contact surface provided continuously across the plurality of ribs so as to oppose to a bead-shaped part. The bead-shaped part is provided at the vehicle body member to partially bulge on the cabin side.

In the present invention, the contact surface preferably slides along the bead-shaped part upon receipt of a load applied to the interior member body on the cabin side, to guide the ribs to break.

In the present invention, the absorber preferably further includes an inclined surface part forming an inclined surface extending along an end side of each of the ribs to reach the contact surface.

In the present invention, the vehicle interior member preferably further includes a longitudinal wall part provided to oppose to the inclined surface part and connected to an end side of each of the ribs. The end side of each of the ribs on the vehicle body member side is provided with an acute angle connecting part where the end side is connected to the longitudinal wall part at an acute angle.

The present invention provides a vehicle interior member that properly absorbs input energy of a load.

DETAILED DESCRIPTION

Figure 1:
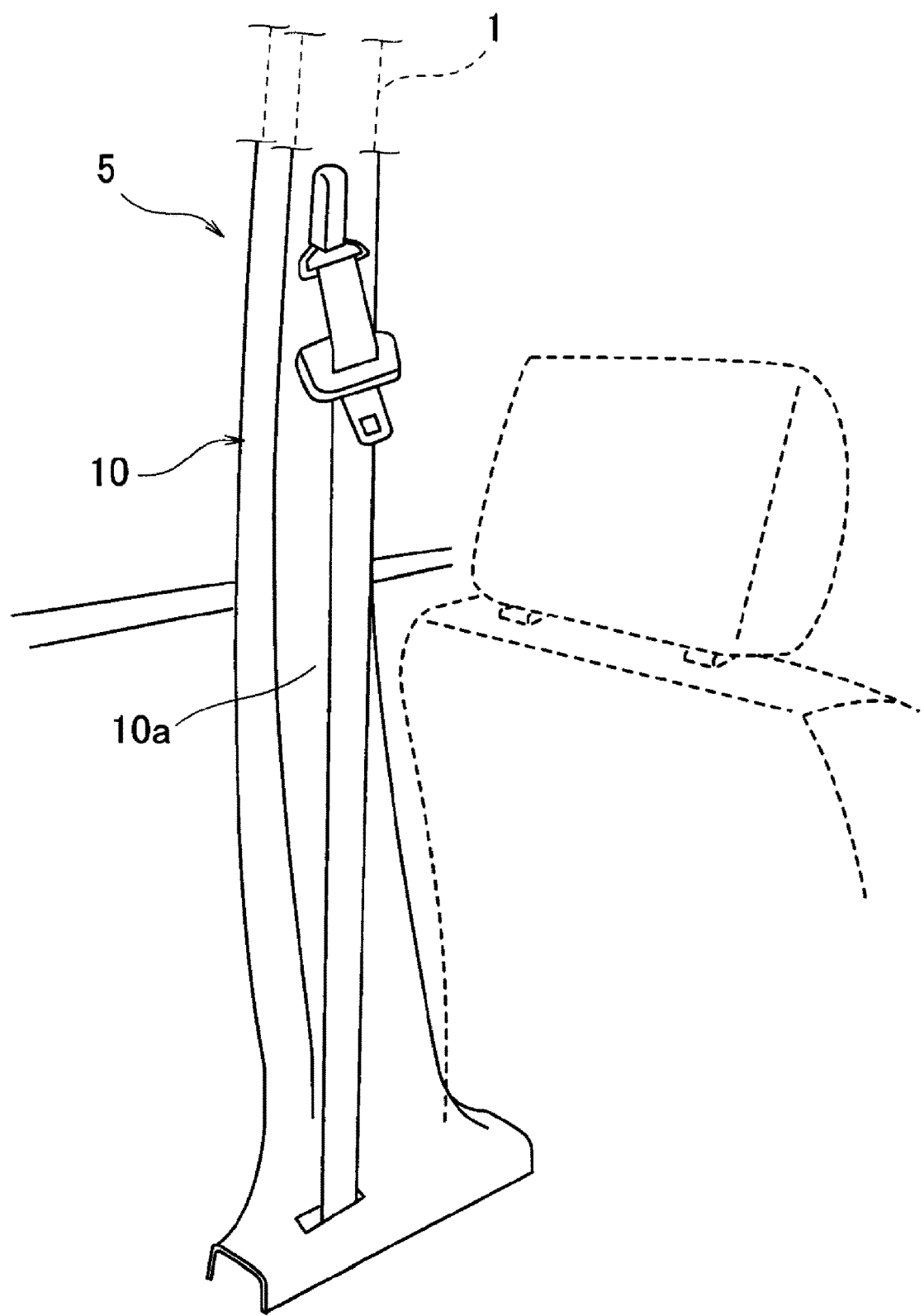
FIG. 1 is a schematic perspective view of a center pillar trim which covers a center pillar on the cabin side.
Figure 2:
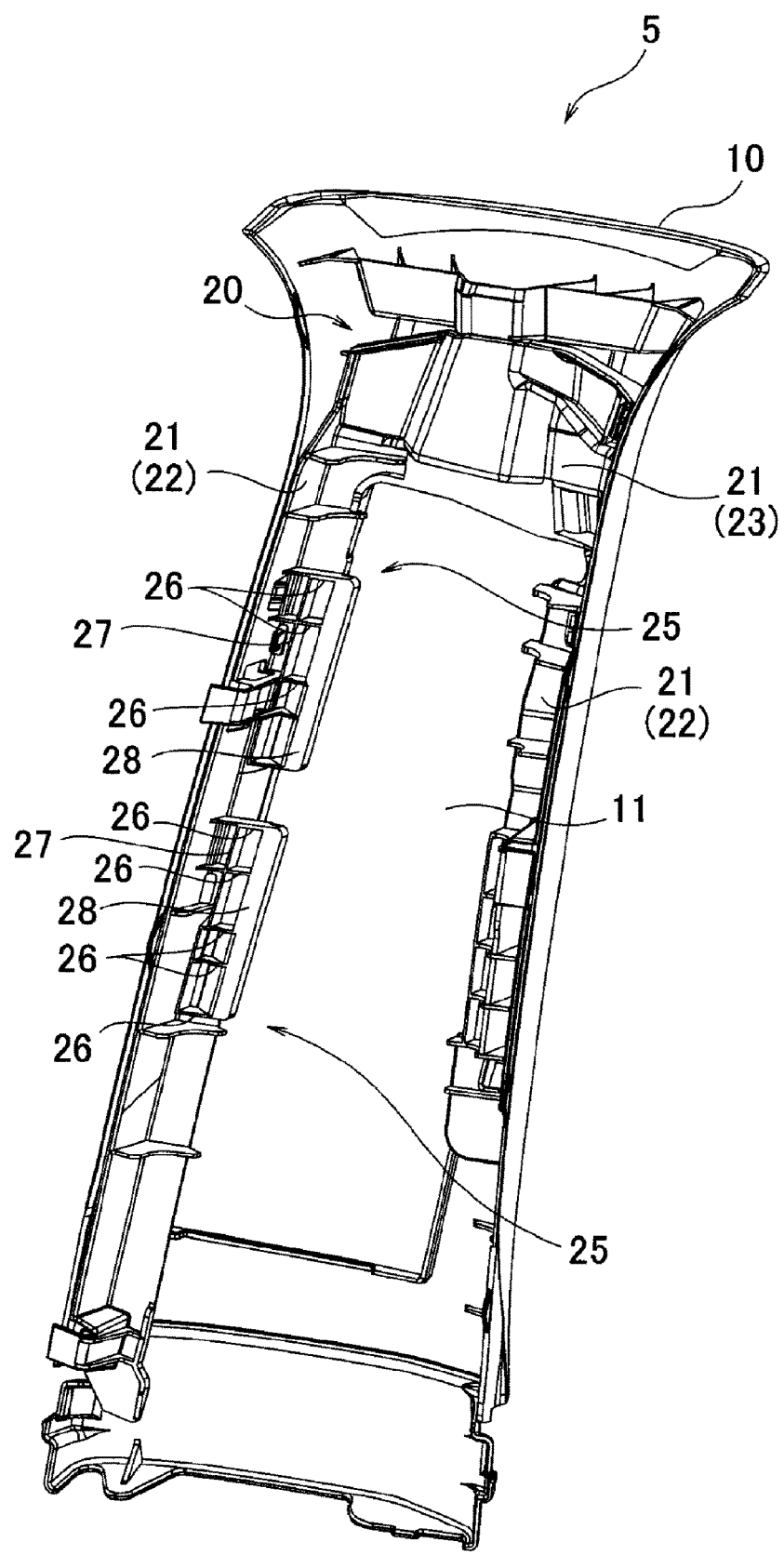
FIG. 2 is a schematic perspective view of the back surface side of the center pillar trim.
Figure 3:
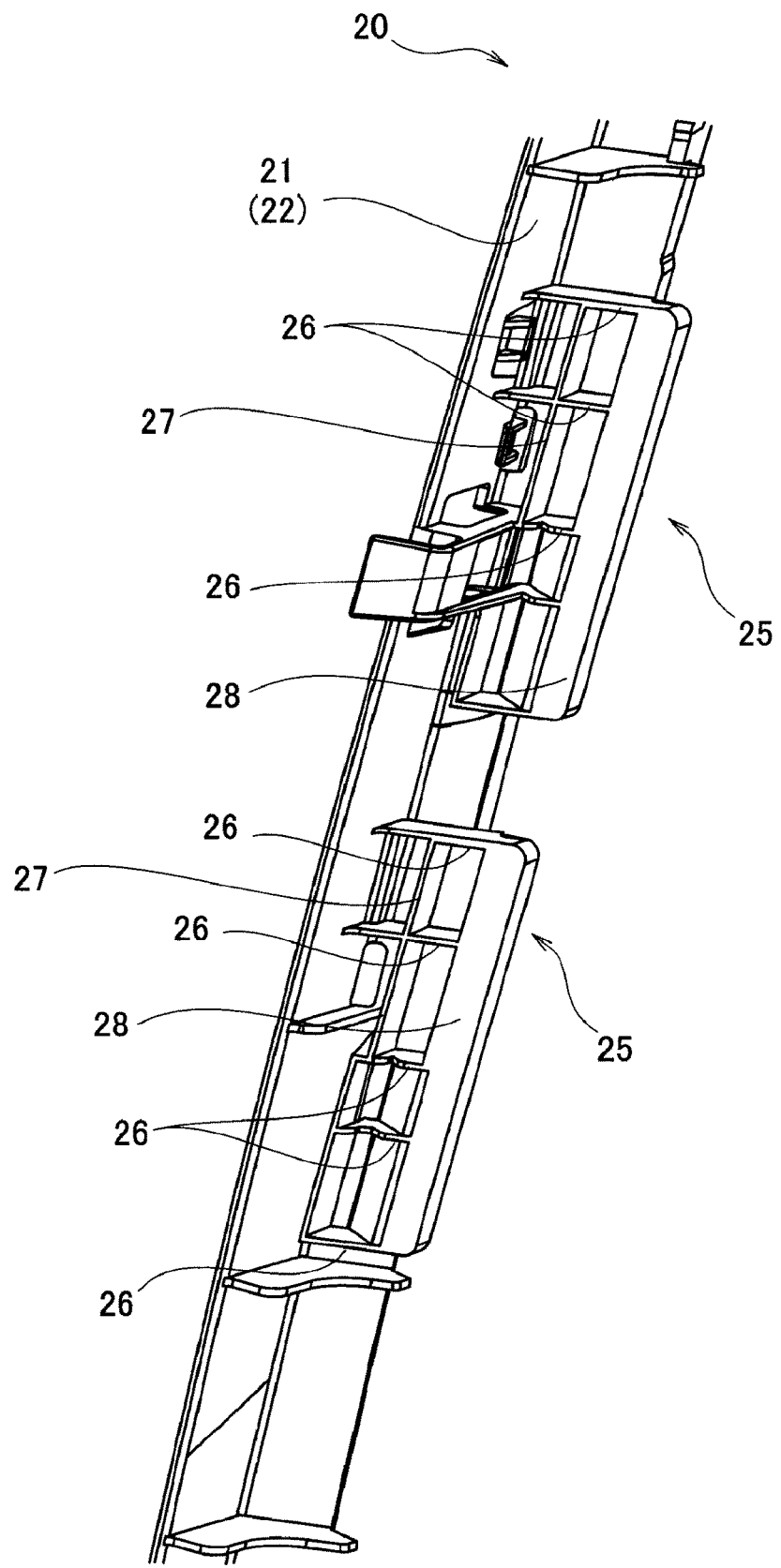
FIG. 3 is a perspective view of a main part of an absorbing member mainly formed of an absorber.
Figure 4:
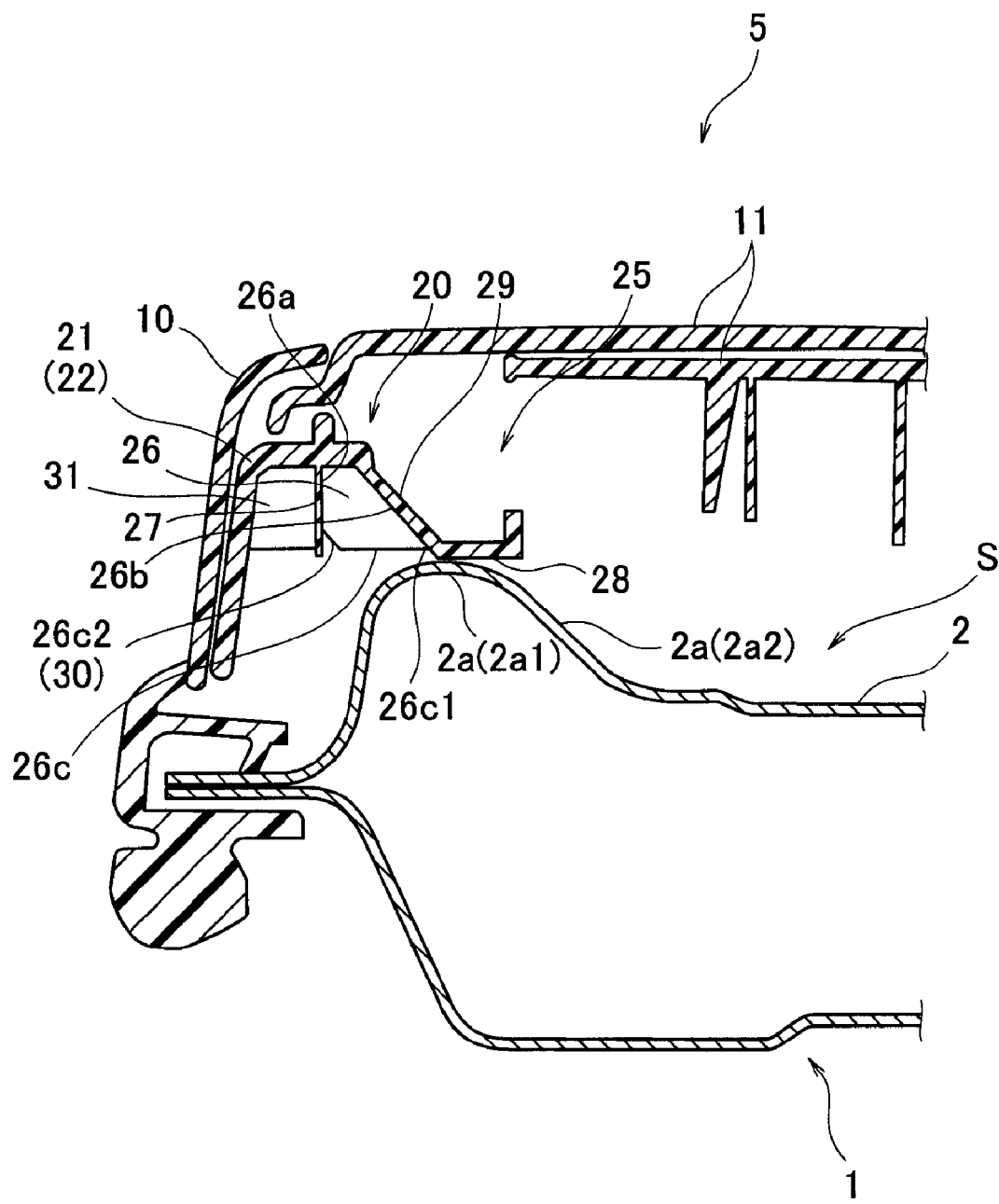
FIG. 4 is an explanatory cross-sectional view of the center pillar including the center pillar trim.

In the following, a description will be given of a center pillar 1 which is a vehicle body member of an automobile, as a vehicle interior member according to the present embodiment. FIG. 1 is a schematic perspective view of a center pillar trim 5 which covers the center pillar 1 on the cabin side. FIG. 2 is a schematic perspective view of the back surface side of the center pillar trim 5. FIG. 3 is a perspective view of a main part of an absorbing member 20 mainly formed of an absorber 25. FIG. 4 is an explanatory cross-sectional view of the center pillar 1 including the center pillar trim 5.

The center pillar 1 forms a top-bottom direction frame member across a vehicle body opening where a side door is to be mounted. The bottom end of the center pillar 1 is coupled to a vehicle side sill (not shown) which forms a front-rear direction frame member on the floor side.

The center pillar 1 includes a panel 2 on the cabin side, which panel 2 includes a bead-shaped part 2a partially bulging on the cabin side. The bead-shaped part 2a extends in the vehicle top-bottom direction and provided at each of the opposite ends in the vehicle front-rear direction. The bead-shaped part 2a is provided for securing the stiffness of the vehicle. Between the pair of bead-shaped parts 2a respectively positioned on the opposite ends of the panel 2, space S is formed.

The center pillar trim 5 is an interior member mounted to cover substantially the entire panel 2 of the center pillar 1 on the cabin side.

The center pillar trim 5 is mainly formed of a trim body 10 which covers the center pillar 1, and an absorbing member 20.

The trim body 10 is molded using any appropriate synthetic resin material. The horizontal cross-sectional shape of the trim body 10 is substantially U-shaped conforming to the horizontal cross-sectional shape of the panel 2 on the cabin side.

The trim body 10 includes a slide plate 11 for drawing a seat belt. The slide plate 11 is vertically elongated quadrangular along a general surface 10a of the trim body 10. The slide plate 11 is slidably engaged with the trim body 10 on its back surface side.

The absorbing member 20 receives a load F applied to the center pillar trim 5 and deforms and breaks, thereby absorbing the input energy of the load F. The absorbing member 20 is formed of the base member 21 and the absorber 25. The absorbing member 20 is molded using any appropriate synthetic resin material, and the base member 21 and the absorber 25 are integrally formed.

The base member 21 is formed of a pair of base parts 22 respectively disposed along the corners of the trim body 10 on the back surface side of the trim body 10, and a coupling part 23 coupling between the pair of base parts 22 at their upper ends.

The absorber 25 is disposed at each base part 22 of the base member 21, and formed of a plurality of horizontal ribs 26, a longitudinal wall part 27, a contact surface 28, and an inclined surface part 29.

The horizontal ribs 26 are each a plate-like member rising perpendicularly to a face of the trim body 10. For example, as seen from above with reference to the vehicle, the horizontal ribs 26 are each substantially trapezoidal. The plurality of horizontal ribs 26 are arranged in the vehicle top-bottom direction having their respective faces opposed to each other.

The longitudinal wall part 27 is a longitudinal wall-like member extending in the vehicle top-bottom direction, and continuous to the base member 21. To the longitudinal wall part 27, an end side 26a of each of the horizontal ribs 26 on the base member 21 side is connected.

The contact surface 28 is a planar part provided continuous to one corner 26c1 of an end side 26c of each horizontal rib 26, which end side 26c opposes to the center pillar 1. The contact surface 28 is provided so as to oppose to the bead-shaped part 2a of the center pillar 1. Specifically, the contact surface 28 is provided on the inclined part 2a2 side corresponding to the space S, with reference to a top 2a1 of the bead-shaped part 2a.

The inclined surface part 29 is a planar part which is formed along an end side 26b of each horizontal rib 26, which end side 26b opposes to the longitudinal wall part 27, so as to connect between the base member 21 and the contact surface 28. The inclined surface part 29 forms an inclined surface which is substantially parallel to the inclined part 2a2 on the space S side forming the bead-shaped part 2a. Further, to the inclined surface part 29, the end side 26b of each horizontal rib 26 is connected.

At a corner 26c2 connected to the longitudinal wall part 27 in the end side 26c of each horizontal rib 26, which end side 26c is on the center pillar 1 side, an acute angle connecting part 30 is provided. The acute angle connecting part 30 is a site where the end side 26c on the center pillar 1 side is connected to the longitudinal wall part 27 at an acute angle, and formed by the corner 26c2 of the end side 26c being cut out by an acute angle.

In the absorber 25 structured as described above, the longitudinal wall part 27, the contact surface 28 and the inclined surface part 29 are continuously provided over a plurality of horizontal ribs 26. Here, it is not necessary for the longitudinal wall part 27, the contact surface 28, and the inclined surface part 29 to be continuous across all the horizontal ribs 26 arranged in the top-bottom direction and instead, as shown in FIGS. 2 and 3, they are not continuous and separated between particular ones of the horizontal ribs 26.

Between the longitudinal wall part 27 and the base member 21, an auxiliary rib 31 is provided in view of securing stiffness of the absorbing member 20 itself.

Figure 5:
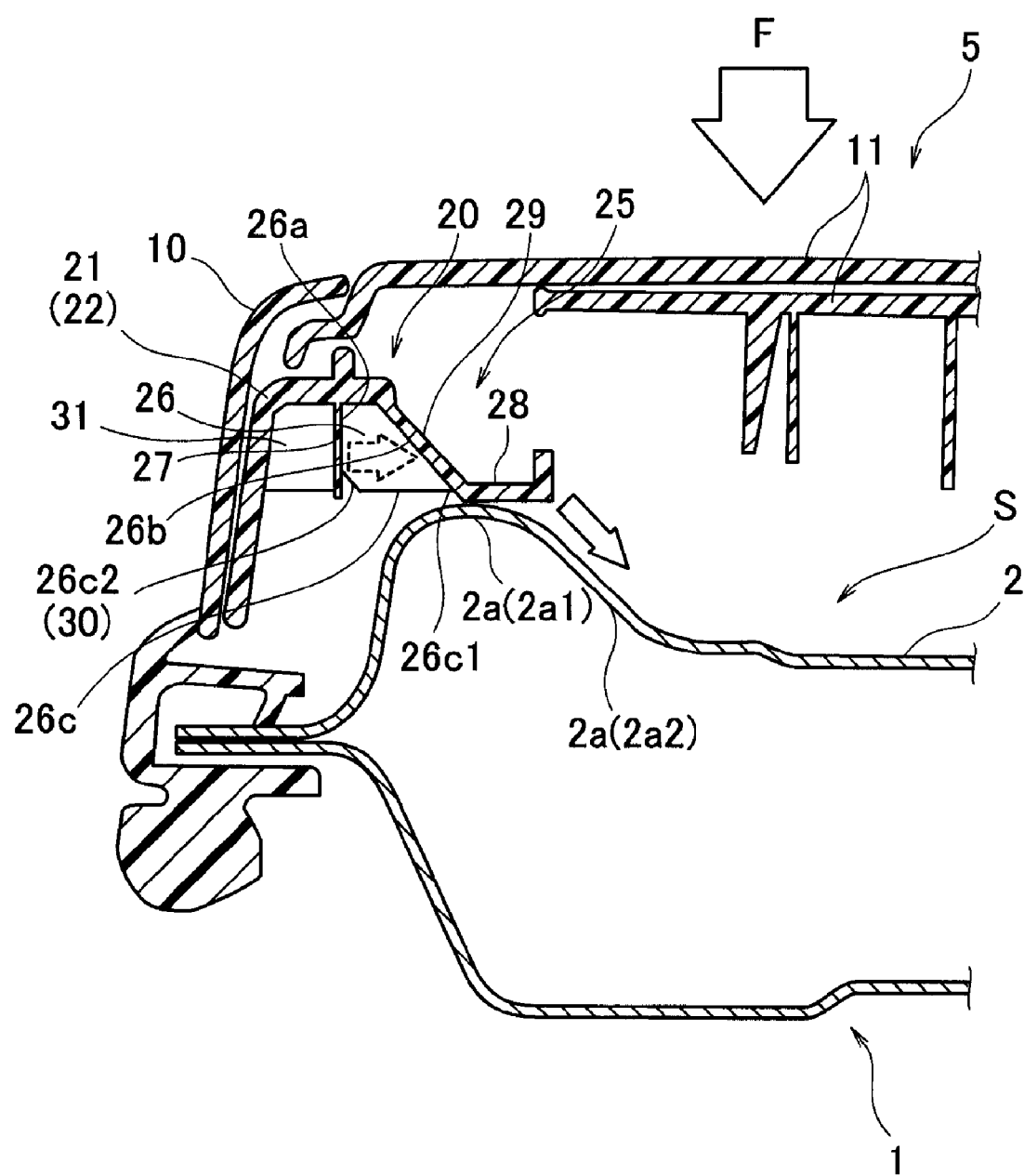
FIG. 5 is a schematic explanatory illustration of a shock absorbing structure of the center pillar trim.

In the following, a description will be given of the shock absorbing structure of the center pillar trim 5 according to the present embodiment. FIG. 5 is a schematic explanatory illustration of the shock absorbing structure of the center pillar trim 5.

For example, in a case where any shock is externally applied to the side of the vehicle and, consequently, a load F is input to the center pillar 1 on the cabin side, the input load F is received by the trim body 10. Thus, the trim body 10 shifts toward the center pillar 1, and the load F is input also to the absorbing member 20 (the absorber 25) positioned on the back surface side of the trim body 10.

The load F presses the contact surface 28, which opposes to the bead-shaped part 2a, against the bead-shaped part 2a. Under this load F input to the absorber 25, the contact surface 28 is obliquely pushed out in the inclined direction of the inclined surface part 29 by being guided by the inclined shape of the inclined surface part 29. Thus, the contact surface 28 slides along the inclined part 2a2 of the bead-shaped part 2a.

By the contact surface 28 sliding along the inclined part 2a2, the horizontal rib 26 is pulled by the contact surface 28 and the inclined surface part 29 continuous to the contact surface 28 and deforms. As a result, the input energy of the load F is absorbed.

As the contact surface 28 further slides along the inclined part 2a2, a crack occurs at the connecting portion (the end side 26a) between the horizontal rib 26 and the longitudinal wall part 27, whereby the horizontal rib 26 breaks.

In particular, at the corner 26c2 connected to the longitudinal wall part 27 in the end side 26c of the horizontal rib 26, the acute angle connecting part 30 is provided. This weakens the portion where the horizontal rib 26 is connected to the longitudinal wall part 27 and, consequently, the horizontal rib 26 breaks from the portion where it is connected to the longitudinal wall part 27.

The horizontal rib 26 being broken further absorbs the input energy of the load F.

The contact surface 28 sliding along the inclined part 2a2 of the bead-shaped part 2a causes the inclined surface part 29 of the absorber 25 or the broken horizontal rib 26 to enter the space S formed by the bead-shaped part 2a. This minimizes the risk of the broken structure obstructing the travel of the trim body 10 to the center pillar 1. As a result, the input energy of the load F is absorbed properly.

Thus, in the present embodiment, the center pillar trim 5 covering the center pillar 1 includes the trim body 10 covering the center pillar 1, and the absorber 25 disposed between the trim body 10 and the center pillar 1. The absorber 25 includes a plurality of horizontal ribs 26 rising perpendicularly to a face of the trim body 10 having their respective faces opposed to each other, and the contact surface 28 provided continuously across the plurality of horizontal ribs 26 so as to oppose to the bead-shaped part 2a, which is provided at the center pillar 1 to partially bulge on the cabin side.

In this structure, by virtue of provision of the contact surface 28 provided at the horizontal ribs 26 so as to oppose to the bead-shaped part 2a, the contact surface 28 slides along the inclined part 2a2 of the bead-shaped part 2a when a load F is input on the cabin side, thereby guiding the horizontal ribs 26 to break. Thus, through the deformation and breakage of the horizontal ribs 26, the input energy of the load F is absorbed properly.

In this structure, by virtue of the contact surface 28 sliding along the inclined part 2a2 of the bead-shaped part 2a, the broken horizontal ribs 26 enter the space S of the panel 2. This minimizes the risk of the broken structure being caught by the center pillar 1, that is, secures the travel of the trim body 10 to the center pillar 1. As a result, the input energy of the load F is absorbed properly.

In the present embodiment, the absorber 25 further includes the inclined surface part 29 which forms the inclined surface extending along the end side 26b of each of the horizontal ribs 26 to reach the contact surface 28.

In this structure, the load F is transferred along the inclined surface part 29. This facilitates shifting of the contact surface 28 receiving the load F along the inclined part 2a2 of the bead-shaped part 2a. Thus, energy is absorbed properly.

The end side 26c of the horizontal rib 26 on the center pillar 1 side is provided with the acute angle connecting part 30 where the end side 26c is connected to the longitudinal wall part 27 at an acute angle.

In this structure, each horizontal rib 26 breaks from the portion where it is connected to the longitudinal wall part 27. That is, the portion to break is controlled and, therefore, energy is absorbed properly.

In the present embodiment, the contact surface 28 is not continuous, that is, separated between particular ones of the horizontal ribs 26.

In this structure, the energy absorbing amount can be adjusted through any change in the separation portion of the contact surface 28. This provides the center pillar 1 which properly supports any energy absorption characteristic.

In the foregoing, the description has been given of the center pillar trim 5 as the vehicle interior member according to the present embodiment. The present invention is not limited to the present embodiment, and various changes may be made within the scope of the invention.

For example, the application of the vehicle interior member is not limited to a center pillar, and the present invention may be applied to a front pillar or a rear pillar. Furthermore, the application of the vehicle interior member is not limited to the pillars but includes a wide range of vehicle body members, that is, frame members and panel members forming a vehicle.

In the vehicle interior member according to the present embodiment, the absorbing member including the absorber is assembled onto the trim body. Here, the trim body and the absorber may be integrated, that is, the flat plate-like ribs and the contact surface may be directly formed at the trim body.

REFERENCE SIGNS LIST

1: center pillar
2: panel
2a: bead-shaped part
2a1: top
2a2: inclined part
5: center pillar trim (interior member)
10: trim body (interior member body)
11: slide plate
20: absorbing member
21: base member
22: base part
23: coupling part
25: absorber
26: horizontal rib
26a, 26b, 26c: end side
26c1, 26c2: corner
27: longitudinal wall part
28: contact surface
29: inclined surface part
30: acute angle connecting part
S: space

The invention claimed is:

1. A vehicle interior member mounted on a cabin side to cover a vehicle body member of a vehicle, the vehicle interior member comprising:
   an interior member body configured to cover the vehicle body member; and
   an absorber provided between the interior member body and the vehicle body member, the absorber including
      a plurality of ribs rising perpendicularly to a face of the interior member body having their respective faces opposed to each other, and
      a contact surface provided continuously across the plurality of ribs so as to oppose to a bead-shaped part, the bead-shaped part provided at the vehicle body member to partially bulge on the cabin side,
   wherein the contact surface slides along the bead-shaped part upon receipt of a load applied to the interior member body on the cabin side: so that the absorber deforms or breaks the ribs.

2. The vehicle interior member according to claim 1, wherein the absorber further includes an inclined surface part forming an inclined surface extending along an end side of each of the ribs to reach the contact surface.

3. The vehicle interior member according to claim 2, further comprising:
   a longitudinal wall part provided to oppose to the inclined surface part and connected to an end side of each of the ribs;
   wherein the end side of each of the ribs on the vehicle body member side is provided with an acute angle connecting part where the end side is connected to the longitudinal wall part at an acute angle.

* * * * *